Feb. 11, 1936.  R. J. BRITTAIN, JR., ET AL  2,030,237
GAUGING MACHINE
Original Filed July 3, 1926   2 Sheets-Sheet 1

INVENTORS:
RICHARD J. BRITTAIN JR,
JOHN C. BELL,
BY
THEIR ATTORNEY.

Feb. 11, 1936.   R. J. BRITTAIN, JR., ET AL   2,030,237
GAUGING MACHINE
Original Filed July 3, 1926   2 Sheets-Sheet 2
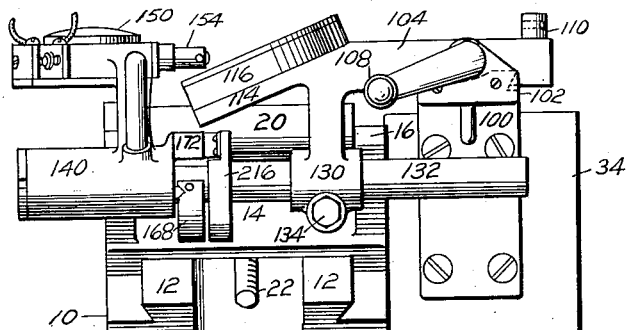
FIG. 3.
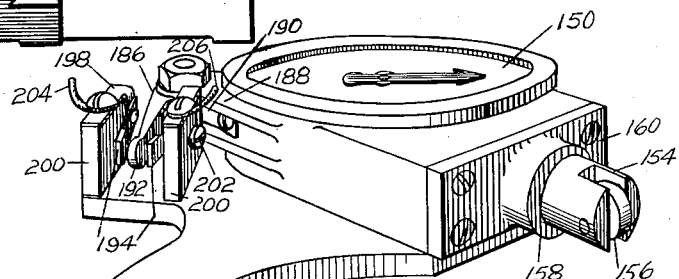
FIG. 4.
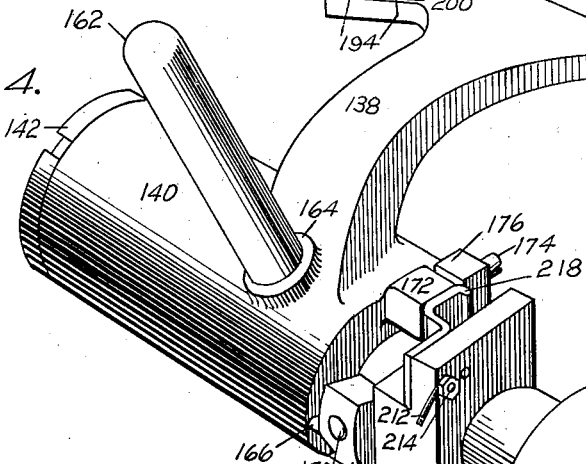
FIG. 5.
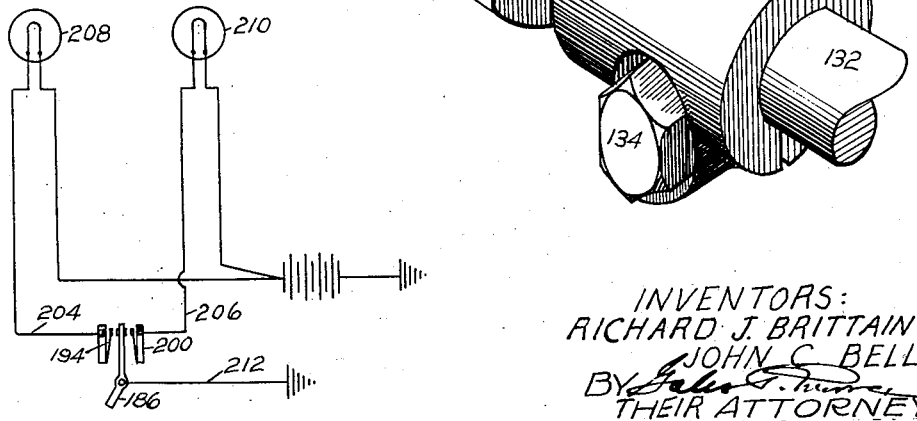
INVENTORS:
RICHARD J. BRITTAIN JR.,
JOHN C. BELL,
BY
THEIR ATTORNEY.

Patented Feb. 11, 1936

2,030,237

UNITED STATES PATENT OFFICE 2,030,237

GAUGING MACHINE

Richard J. Brittain, Jr., Newark, and John C. Bell, Lyndhurst, N. J., assignors to General Motors Corporation, Detroit, Mich., a corporation of Delaware Application July 3, 1926, Serial No. 120,313
Renewed July 12, 1933

27 Claims. (Cl. 33—147)

This invention relates to gauging machines and comprises all the features of novelty herein shown, by way of example, as embodied in a machine for simultaneously gauging wall variation, outside diameter, and length of hollow cylinders or sleeves.

An object of the invention is to provide improved apparatus for detecting variations in certain dimensions of an article such as a sleeve. Another object is to provide an improved apparatus for measuring the thickness of a hollow article at all points in its circumference and also for determining such dimension simultaneously with the detection of unacceptable variations in another dimension of the article. Another object is to provide improved apparatus for indicating an out of round condition of an article of any selected diameter. Another object is to provide improved apparatus for detecting variation in the length of an article such as a sleeve. Still another object is to provide apparatus for supporting and rotating round articles of any selected size in a predetermined relation to a series of gauging devices for detecting variations in certain dimensions. Yet another object is to provide improved apparatus for supporting and rotating hollow articles in a definite position for an operation on the inner wall thereof.

To these ends and to improve generally upon devices of this general character, the invention also consists in the various matters hereinafter described and claimed.

The invention, in its broader aspects, is not necessarily limited to the particular embodiment selected for mere illustrative purposes in the accompanying drawings in which Figure 1 is a plan view of the apparatus with some parts in section.

Figure 3 is a side elevation with some parts removed.

Figure 4 is a perspective view of certain details.

Figure 5 is a diagram.

Figure 1:
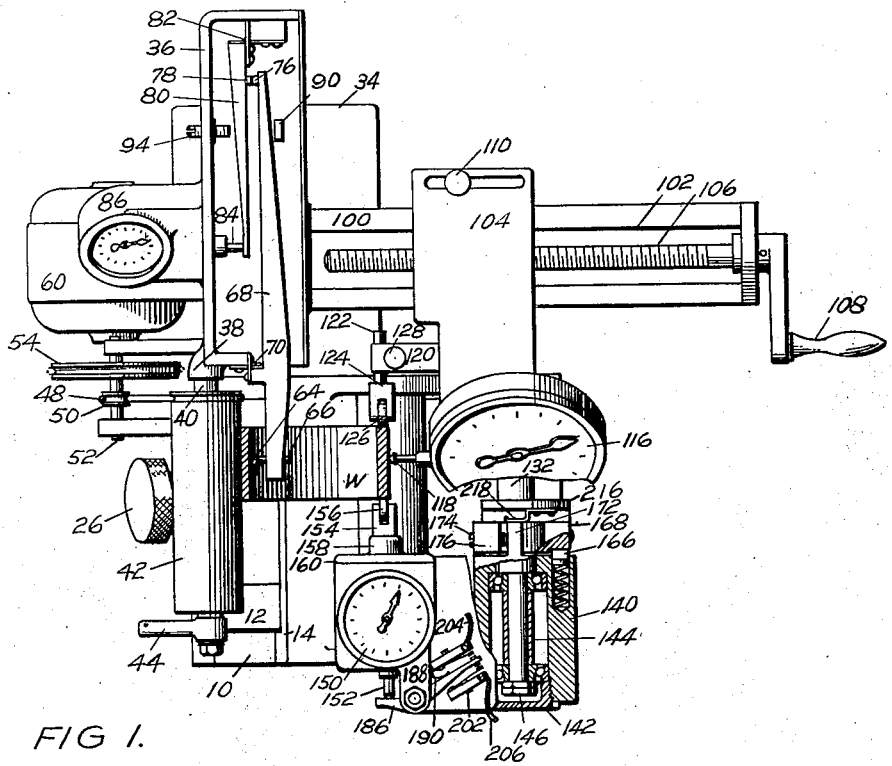
Figure 2:
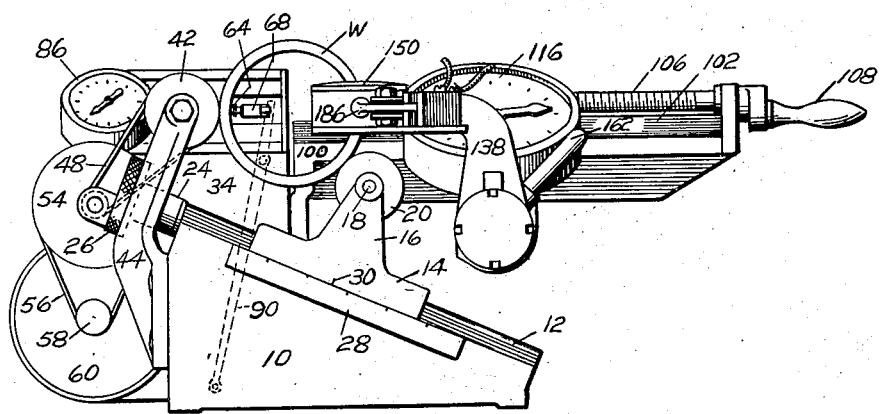
Figure 2 is a front elevation.

In the drawings, 10 indicates a base frame to rest on a bench or table and having near the front a pair of spaced inclined tracks or ways 12 dovetailed to receive a slide 14 having standards 16 with trunnions 18 for rotatably supporting a wheel or roller 20. A nut (not shown) is fastened to the under side of the slide for engagement with a feed screw 22 having its upper reduced end journalled for rotation in a plate 24 fastened to the upper end of the incline. A hand wheel 26 pinned to the upper end of the shaft holds the feed screw against axial movement and serves as a means for adjusting the slide along the ways. A scale plate 28 fastened to the front of the slideway cooperates with an index line 30 on the front of the slide to indicate the position of the roller 20 as will appear.

The frame 10 has a hollow standard 34 at one rear corner to which a gauge box 36 is bolted. The box has a hollow boss 38 receiving the end of a shaft 40 which rotatably supports a wheel or roller 42 parallel to the roller 20. Roller 42 preferably rolls on ball bearings (not shown). The front end of the shaft 40 is threaded and clamped by a nut in a bracket 44 on the side of the frame, near the front. The roller 42 is rotated by a round belt 48 trained around a groove at the rear end of the roller and around a small pulley 50 on a countershaft 52 journalled on the frame and having a large pulley 54 driven by a belt 56 from a pulley 58 on the shaft of an electric motor 60. The two rollers 20 and 42 have parallel axes, in the preferred embodiment, and support an article, such as a sleeve W, the dimensions of which are to be tested during rotation. When the rollers have parallel axes, the roller 20 is adjusted by its inclined slide for the purpose of supporting, by line contact, all sleeves to be tested in such a position that their axes are parallel to the axis of roller 42 and in the same plane with this axis and with certain gauge members, as will appear. In the illustrated construction, the axis of roller 42 and the gauge members are arranged in a horizontal plane and sleeves W of any diameter are capable of support with their axes in this plane. The scale plate 28 may be so marked that it will indicate the proper positions of the slide to support sleeves of different diameters at this level. When the roller 42 or the article is not cylindrical, the axes of rotation of the roller and the article will not be parallel but nevertheless the line of contact of the roller with an article under test will bear a constant relation to the axis of rotation of the article.

For gauging or testing the wall thickness of a sleeve W, the following mechanism is provided. A gauge member or feeler 64 on an adjusting screw 66 continuously rides on the interior surface of the sleeve in the same plane with the axis of the sleeve and of the roller 42. The adjusting screw 66 is carried by the short arm of a long lever 68 pivoted at 70 in a known way by thin crossed springs attached to cleats on the lever and on the gauge box. The longer arm of the lever 68 has a contact button 76 engaging a button 78 on a second lever 80 pivoted to the gauge box at 82 on crossed springs. The free end of the second lever bears against the stem 84 of an indicator 86 fastened to the outside of the gauge box. The indicator has a needle which indicates if there is an unacceptable variation in wall thickness of the rotated sleeve W at any point in its periphery. To make easy the rapid application of a sleeve W to the rollers, the gauge point or feeler 64 is movable directly away from the roller 42 by a treadle operated mechanism comprising a lever 90 which may be pivoted at any suitable point on the frame to locate its upper end at one side of the lever 68, the lever being connected to a treadle (not shown) as by a cable. A stop pin 94 in the path of the lever 80 prevents the lever 90 from swinging the gauge levers far enough to injure the indicator. The usual spring in the indicator presses the levers in a direction to move the gauge member or feeler along a radius of the work-piece and normal to its inner surface so that the thickness is measured and variations in thickness are indicated as the sleeve revolves.

The apparatus also has provision for measuring the length of a sleeve and for measuring the outside diameter or indicating any unacceptable variation in these dimensions or an out of round condition. Bolted to the side of the standard 34 is an angle bracket 100 having a long dovetailed slideway 102 for a dovetailed slide 104 adjustable by a screw 106 operated by a crank handle 108. A hand nut 110 engages a headed clamping screw (not shown) to retain the slide in adjusted position. The slide has an inclined flat portion 114 at the front to support an indicator 116 the stem of which has a gauge point 118 which is in the same plane with both the axis of the sleeve W to be tested and with the axis of the driven roller 42. The gauge point 118 is consequently movable in a radial line normal to the outer circumference of the sleeve W. Both gauge members 64 and 118, of course, also move in a line normal to the roller 42. For work-pieces of different diameters, the slide 104 is adjusted along its slideway to the proper point to procure the correct indicator reading for a standard or master piece.

The slide has a small lateral arm 120 which is split to receive a stem 122 on a fork 124 which rotatably supports a gauge roll 126. The stem 122 is movable endwise through the split arm and can be clamped in adjusted position by a thumb screw 128. This adjustment is for sleeves of different lengths and this roll cooperates with another for measuring the length of a sleeve and indicating any unacceptable variation, as by colored lights, electrically controlled by the gauge. The slide 104 has a depending split sleeve 130 in which a shaft 132 is adjustably fixed by a clamping screw 134. The front end of the shaft is reduced in diameter to receive the inner race rings of ball bearings which rockably support an indicator arm or bracket 138 having a hub 140. The hub carries the outer race rings of the ball bearings and an adjusting nut 142 for one of these outer race rings. A sleeve 144 spaces the inner race rings which are held on the shaft by clamping nuts 146. The indicator bracket or arm 138 is curved and carries an indicator 150 at its end. The stem 152 of the indicator is connected to a fork 154 carrying a gauge roll 156 and is guided in a cup or sleeve 158 on a plate 160 bolted to the indicator housing.

The gauge rolls 126 and 156 are normally opposed to one another and engage opposite ends of the sleeve W to be tested and by their relative movement of approach indicate the size of the sleeve. To facilitate the placing of a sleeve W in testing position, the gauge roll 156 and its supporting structure can be swung upwardly and laterally by a handle 162 threaded in a boss 164 of the hub 140. To hold the arm 138 in up or in down position, its hub carries a spring pressed plunger 166 arranged to engage in radial grooves in a collar 168 fastened to the shaft by a taper pin 170. The plunger snaps back into its recess in the bracket when sufficient force is applied to the handle. The hub 140 has a stop lug 172 arranged to abut against a stop screw 174 threaded in an extension 176 of the collar 168. This locates the gauge roll 156 at the proper level to oppose the gauge roll 126 to thus measure the length of a sleeve. The gauge rolls, being opposite, tend to hold the sleeve W in parallelism with its supporting rollers. The indicator needle may serve to indicate any unacceptable departure from standard length but, preferably, to avoid the necessity for watching too many dials and needles, colored lights or bells are utilized to designate whether a sleeve is unduly oversize or undersize.

The indicator stem 152 is arranged to abut against the short arm of a lever 186 pivoted in a fork 188 formed on the indicator housing. A leaf spring 190 holds the lever against the end of the stem 152. The lever is normally in electrical connection through its supporting bracket and lug 172 with a source of current and its end 192 is normally spaced from opposing contacts on leaf springs 194 fastened by screws to angle plates 198 which are secured to insulating blocks 200 screwed to a flat face on the indicator bracket or arm. Adjusting screws 202 on the insulating blocks adjust the springs in accordance with the acceptable variation in the length of the articles so that contact is made with one side of the lever if the work is oversize or undersize. Wires 204 and 206 lead from binding posts on the angle plates to lights, such as a red light 208 and a white light 210 placed within convenient view of the operator. A return wire 212 from the lights and the source of current is normally in electrical communication with the lever 186 and its arm 138. The wire leads to a screw 214 extending through the upper edge of an insulating pad 216 sleeved on the shaft and fastened to the collar 168. The screw 214 secures a contact clip 218 in a recess of the insulating pad in a position to engage the end of the lug 172 on the hub of the rocking arm 138 when the latter is in swung-down operative position. When the arm is swung up to allow a new article to be inserted, the lug 172 is carried out of contact with the clip 218 to place the lever 186 out of electrical connection with the source of current.

In operation, a sleeve W to be tested or measured, is laid on the rollers 20 and 42 and rotated by contact with the driven or control roller which regulates the speed. In inserting the sleeve, a treadle is actuated temporarily to move the gauge member 64 of the thickness gauge away from the roller 42 and the swinging arm of the length indicator is then in its up position so that the sleeve can be moved substantially axially against the rear gauge roll 126. The act of inserting the sleeve retracts the gauge point 118 of the external diameter gauge. The front gauge roll 156 is then swung down to operative position by means of the handle 162. The operator then notes the action of the indicator needles and the lights as the sleeve rotates, and rejects any piece that is outside the allowable variation. When a sleeve of another diameter is to be tested, the supporting roller 20 is moved up or down with its inclined slide to the point where the axis of the new sleeve is in the plane of the axis of the roller 42 and of the gauge points 64 and 118. The slide 104 is moved horizontally along its slideway to place the outside gauge and the length gauge in the proper position which is preferably diametrically opposite to the roller 42. If the length of the new sleeve is different, the gauge roll 126 is moved by its adjusting stem, and the gauge roll 156 with its associated mechanism is adjusted by clamping the shaft 132 in another position in its sleeve 130. It is not necessary to adjust both rolls 126 and 156 for change in length unless it is desired to measure the wall thickness at the transverse center of the new sleeve.

In order that sleeves of different diameters may all be supported with their axes in the same plane with the gauge members 64 and 118, the roller 20 should be movable at an inclination to this plane which is one half the angle between two radii from the center of the sleeve W to the points of contact of the gauge member 118 and the roller 20 with the periphery of the sleeve. In the illustrated construction, the roller 20 is movable along a 22½° incline and contacts with the sleeve W at a point 45° from the gauge member 118. When the article to be tested is tapered instead of cylindrical, the supporting rollers may have their axes converge in order to maintain line contact with the article while the gauge member is moving along a radius of the article.

We claim:

1. In apparatus of the character described, a roller for engaging a cylindrical article and furnishing a solid backing therefor lengthwise thereof, means for rotating the roller to turn the article, means for holding the article with its axis parallel to and in constant spaced relation to the axis of rotation of the roller, a gauge member, a gauge mounting fixed in a definite relation to the roller and the article holding means for constraining the gauge member to move in a direction substantially normal to the axis of the roller, and an indicator actuated by the gauge member; substantially as described.

2. In apparatus of the character described, a roller constructed and arranged for line contact with a hollow article having an inner wall and an opening, means for rotating the roller to turn the article, means for holding the article with its axis in a constant relation to the line of contact presented by the roller to the article, a gauge member movable in a direction substantially normal to the axis of the roller, a lever carrying said gauge member and entering the hollow article to present the gauge member to the inner wall of the article, and an indicator actuated by the lever; substantially as described.

3. In apparatus of the character described, a pair of rollers for supporting a round article, roller supports for maintaining the rollers in constant spaced relation to support the article for rotation in a definite location, means for rotating one of said rollers to turn the article, a gauge member for riding against the surface of the article while thus supported and movable in a direction normal to one of said rollers, an indicator actuated by the gauge member, a frame, a sliding support for one of said rollers and shiftable on the frame to arrange the rollers for articles of different diameter, and a sliding support shiftable on the frame and carrying said gauge member and indicator; substantially as described.

4. In apparatus of the character described, a roller constructed and arranged for line contact with a round article having an end, means for rotating the roller to turn the article, means for holding the article with its axis in a substantially constant relation to the line of contact presented by the roller to the article, a gauge member movable in a direction substantially normal to the axis of the roller, an indicator actuated by the gauge member, a gauge member engaging an end of the article, an indicator actuated by the last gauge member, and a sliding support for both of said gauge members and indicators; substantially as described.

5. In apparatus of the character described, a roller for engaging a hollow article having inner and outer surfaces and an opening, means for rotating the roller to turn the article, means for holding the article with its axis in constant relation to the axis of rotation of the roller, a gauge member, a gauge mounting fixed in a definite relation to the roller and the article holding means for constraining the gauge member to move in a direction substantially normal to the axis of the roller against the inner surface of the article, a gauge member mounted to move in a direction substantially normal to the axis of the roller against the outer surface of the article the movement of both said gauge members also being radially of the article, and indicators actuated by the gauge members; substantially as described.

6. In apparatus of the character described, a roller for engaging a hollow article having an opening and inner and outer surfaces and an end, means for rotating the roller to turn the article, means for holding the article with its axis parallel to the axis of rotation of the roller, a gauge member mounted to move in a direction substantially normal to the axis of the roller against the inner surface of the article, a gauge member mounted to move in a direction substantially normal to the axis of the roller against the outer surface of the article, the movement of both said gauge members also being radially of the article, a gauge member engaging an end of the article, and indicators actuated by the gauge members; substantially as described.

7. In apparatus of the character described, means for supporting and rotating a round article having opposite ends with said opposite ends of the article exposed, gauge members for engaging the opposite ends of the article and mounted for relative movement of approach, means for indicating the extent of said relative movement, and a swinging support for one of said gauge members; substantially as described.

8. In apparatus of the character described, a roller for supporting a round article having opposite ends by line contact to leave said opposite ends of the article exposed, means for rotating the roller to turn the article, means for holding the article with its axis in substantially constant relation to said line of contact with the roller, rolls for engaging the ends of the article and mounted for relative movement of approach means for indicating the extent of said relative movement, and a swinging support for one of said rolls; substantially as described.

9. In apparatus of the character described, a roller for supporting a hollow article having an inner surface and opposite ends exposed, means for rotating the roller to turn the article, means for holding the article with its axis in substantially constant relation to the axis of rotation of the roller, a gauge member mounted to move in a direction substantially normal to the axis of the roller against the inner surface of the article, and gauging members for engaging the ends of the article and mounted for relative movement of approach, means for indicating the extent of said relative movement, and a swinging support for one of said end gauging members to enable the article to be slipped over the first gauge member and against the other of said end gauging members; substantially as described.

10. In apparatus of the character described, means for supporting and rotating a round article having opposite ends with said opposite ends of the article exposed, gauge members for engaging the opposite ends of the article and mounted for relative movement of approach, means for indicating the extent of said relative movement, and a sliding support for both of the gauge members to carry them towards or from the article supporting means; substantially as described.

11. In apparatus of the character described, means for supporting and rotating a round article having opposite ends with said opposite ends of the article exposed, gauge members for engaging the opposite ends of the article and mounted for relative movement of approach, means for indicating the extent of said relative movement, a sliding support for both of the gauge members to carry them towards or from the article supporting means, and means for varying the initial spacing of said gauge members on said support for articles of different lengths; substantially as described.

12. In apparatus of the character described, means for supporting a round article having ends with the ends of the article exposed, a sliding support movable with respect to the supporting means, a gauge member adjustably carried by said support to engage one end of the article, a rocking arm adjustably carried by the support, a gauge member carried by the rocking arm and movable towards and from the first gauge member, and an indicator actuated by the second gauge member; substantially as described.

13. In apparatus of the character described, means for supporting and rotating a round article having opposite ends with said opposite ends of the article exposed, gauge members for engaging the opposite ends of the article and mounted for relative movement of approach, a lever actuated by one of said gauge members, electric contacts on opposite sides of the lever, and electrically actuated indicating means controlled by the lever and the contacts for indicating the length of the article; substantially as described.

14. In apparatus of the character described, means for supporting and rotating a round article having opposite ends with said opposite ends of the article exposed, gauge members for engaging the opposite ends of the article and mounted for relative movement of approach, a lever actuated by one of said gauge members, electric contacts on opposite sides of the lever, electrically actuated indicating means controlled by said lever and the contacts for indicating the length of the article, and a swingable mounting for one of said gauge members constructed and arranged to render said indicating means inactive; substantially as described.

15. In apparatus of the character described, means for supporting an article with the ends of the article exposed, a gauge member for engaging one end of the article, a rocking arm having a lug, a collar having a stop member to engage said lug, a gauge member mounted on said arm to engage the other end of the article, electrically controlled indicating means actuated by said gauge member for indicating the size of the article, and means for rocking said arm; substantially as described.

16. In apparatus of the character described, means for supporting an article with the ends of the article exposed, a gauge member for engaging one end of the article, a rocking arm having a lug, a collar having a stop member to engage said lug, a contact making member engaging said lug, a gauge member mounted on said arm to engage the other end of the article, electrically controlled indicating means in circuit with said lug for indicating the size of the article, and means for rocking said arm to carry said lug away from the contact making member; substantially as described.

17. In apparatus of the character described, a roller having line contact with the exterior surface of a round article, means for rotating the roller to turn the article, a second roller having line contact with the exterior surface of the article, a mounting for maintaining the rollers in constant spaced relation to support the article for rotation in a definite location, a gauge member for riding on the surface of the article when rotatably supported by the rollers, means for supporting the gauge member for movement substantially along a radius of the article, and size indicating means actuated by the gauge member; substantially as described.

18. In apparatus of the character described, a roller constructed and arranged for line contact with a round article, means for causing rotation of the roller and the article, means for holding the article with its axis in a substantially constant relation to the line of contact presented by the roller to the article, a gauge member, a gauge mounting fixed in a definite relation to the roller and the article holding means for constraining the gauge member to move in a direction substantially normal to the axis of the roller, and an indicator actuated by the gauge member; substantially as described.

19. In apparatus of the character described, a pair of rollers constructed and arranged for line contact with the exterior surface of a round article, the rollers having a mounting for maintaining them in constant spaced relation to support the article for rotation in a definite location, means for rotating one of the rollers to turn the article on its axis, a gauge member for riding against the surface of the article while so supported and movable in a direction substantially normal to the axis of one of the rollers, and an indicator actuated by the gauge member; substantially as described.

20. In apparatus of the character described, a pair of rollers constructed and arranged for line contact with the exterior surface of a hollow round article having an inner surface and an opening, the rollers having a mounting for maintaining them in constant spaced relation to support the article for rotation in a definite position, means for rotating one of the rollers to turn the article on its axis, a gauge member for riding against the inner surface of the article while thus supported and movable in a direction substantially normal to the axis of one of the rollers, an indicator actuated by the gauge member, and means for moving the gauge member away from said last roller to facilitate placing an article in gauging position; substantially as described.

21. In apparatus of the character described, a pair of rollers for supporting a round article by engagement with the outer surface thereof, means for rotating one of the rollers to turn the article, a mounting for maintaining the rollers in constant spaced relation to support the article for rotation in a definite location, a gauge member for riding against the surface of the article while thus supported and movable in a direction substantially normal to the axis of the article, an indicator actuated by the gauge member, and a sliding support for one of the rollers to space the rollers for supporting an article of another size in corresponding relation to the gauge member; substantially as described.

22. In apparatus of the character described, a roller for engaging the exterior surface of a hollow round article having a bore thereon, a second roller for engaging the exterior surface of the article at another location, means for rotating one of the rollers to turn the article, the rollers being maintained in constant spaced relation to support the article for rotation in a definite location, a member entering the bore of the article to engage the inner wall thereof, and means for causing pressure of said member against said inner wall in a direction towards the axis of one of said rollers at a point opposite to the contact line between the exterior surface of the article and said roller; substantially as described.

23. In apparatus of the character described, a control roller having rolling line contact with a round article to control rotation thereof, means for rotatably driving the control roller, a second roller having rolling line contact with the article, a mounting for maintaining the rollers in constant spaced relation to support the article with its axis of rotation in a substantially unvarying line, a member contacting with the article during its rotation in the supported position, and a mounting for said member to maintain its article contacting portion in a plane containing both the axis of the article and the line of contact of said article with one of the rollers; substantially as described.

24. In apparatus of the character described, a control roller having rolling line contact with a round article to control rotation thereof, means for rotatably driving the control roller, a second roller having rolling line contact with the article, a member contacting with the article in a plane passing through the axis of the article and through the line of contact of the article with one of the rollers, and means for adjusting the other of the rollers to move its axis in a plane at an angle to said first plane to support articles of various selected diameters with their axes in said first plane; substantially as described.

25. In apparatus of the character described, a roller having rolling line contact with the exterior surface of a hollow round article having an inner wall and an opening, other means having supporting contact with the article to maintain its axis of rotation in a substantially constant relation to said line of contact, means for effecting rotation of the article in supported position, a member engaging the inner wall of the article at a point directly opposite to the external line of contact with the roller, and means mounting said member and said roller so that one is urged towards the other in a direction to maintain the point of contact and the line of contact always in the same plane; substantially as described.

26. In a machine of the character indicated, the combination with a work-support having unyielding means for engaging one surface of a hollow work-piece at a plurality of points to hold the work-piece for rotation upon said support, of an implement so related to said support that it engages the work-piece upon the surface other than that engaged by said support and at a point in the zone supported by said support and substantially opposite to one of the unyielding means, and a mounting for constraining the implement to move radially of the work-piece and normal to said unyielding means; substantially as described.

27. In a machine of the character indicated, a regulating wheel for engaging one surface of a hollow work-piece and rotatably driven to regulate the surface speed of the work-piece, an implement engaging the other surface thereof along that axial plane of the work-piece which includes the place of engagement of said regulating wheel with the work-piece, and means for steadying the work-piece during the period the said implement is engaging it; substantially as described.

JOHN C. BELL.
RICHARD J. BRITTAIN, JR.